UNITED STATES PATENT OFFICE.

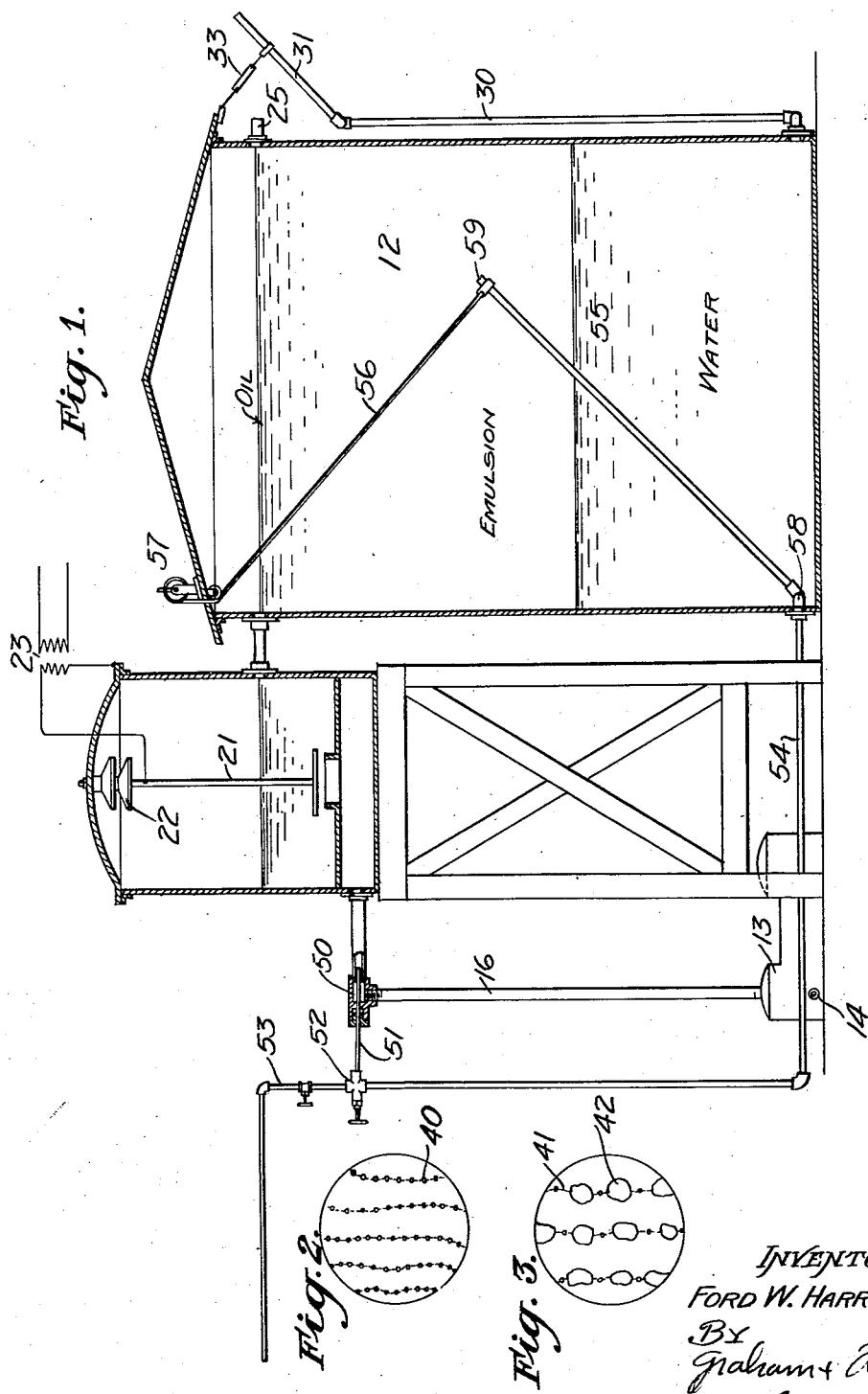

FORD W. HARRIS, OF LOS ANGELES, CALIFORNIA, ASSIGNOR TO PETROLEUM RECTIFYING COMPANY, OF SAN FRANCISCO, CALIFORNIA, A CORPORATION OF CALIFORNIA.

METHOD AND APPARATUS FOR DEHYDRATING EMULSIONS.

1,405,130.    Specification of Letters Patent.    Patented Jan. 31, 1922.

Application filed July 6, 1921. Serial No. 482,711.

*To all whom it may concern:*

Be it known that I, FORD W. HARRIS, a citizen of the United States, residing at Los Angeles, in the county of Los Angeles and State of California, have invented a new and useful Method and Apparatus for Dehydrating Emulsions, of which the following is a specification.

My invention relates to the art of dehydrating petroleum emulsions by means of electrical discharges, and the principal object of my invention is to provide means by which tight emulsions, which have been considered very hard to treat by any electrical process, may be put into such condition that they yield readily to the electric treatment.

It is well known that emulsions of oil and water are quite stable where the water particles are very fine and that in many such emulsions the water will not settle out by gravity even if the emulsion is allowed to stand for long periods. It is also well known that by forcing an electric current of proper magnitude through such emulsions that the trapped water of the emulsion is in some manner freed or agglomerated into larger masses and that this free water readily settles out if the mixture is allowed to stand. It is found, however, that certain emulsions, hereinafter called tight emulsions, are very hard to treat and it is the object of my invention to provide means by which such emulsions may be readily put into such a condition that they can be readily treated.

Further objects and advantages will be set forth more in length in the following specification.

In the drawing, which is for illustrative purposes only,

Fig. 1 is a diagrammatic view of an apparatus embodying my invention.

Fig. 2 is a view of a small amount of tight emulsion as it would appear under the microscope when subjected to electrical stresses.

Fig. 3 is a similar view of an emulsion as modified by my process.

The apparatus used is shown very diagrammatically in Fig. 1 in which 11 is the treater which may be of any convenient construction, 12 is a settling tank and 13 is the pump used to force the emulsion delivered by a pipe 14 through a pipe 16 into the treater 11.

The emulsion entering the treater 11 near the bottom thereof passes upwardly through a diaphragm having a hole 20 therein, an electrode 21 being suspended above the hole 20 on an insulator 22. The electrode 21 has an electrical potential impressed thereon by means of a transformer 23, one terminal of which is connected to the electrode 21 and the other terminal of which is connected to the tank of the treater 11. In effect the upturned edges of the hole 20 and the electrode 21 form the terminals of an electric circuit. Being immersed in the emulsion an electric field is set up in the body of the emulsion and an electric current flows between the edges of the hole 20 and the electrode 21. The liquids flow from the treater through a pipe 24 into the settling tank 12.

In the tank 12 the free water settles out from the oil, the oil being readily drawn off from the top of the tank 12 through an oil pipe 25 and the water being drawn off from the bottom of the tank 12 through a water pipe 30 which may conveniently be arranged to drain the water from the tank 12 automatically. For the purpose of automatic drainage of water the upper and outer end of the pipe 30 is equipped with a swing 31 which is held up by a turn buckle 33. By adjusting the height of the outer end of the swing 31 the height of the column of water in the pipe 30 may be readily varied so that it will balance against a greater or less height of water inside the tank 12 thus regulating the amount of water which is allowed to collect in the bottom of the tank 12 and siphoning it off whenever it exceeds that amount. This arrangement of automatic water relief is well known in the art and forms no part of the present invention.

I have found that where a treater like that illustrated is used on various kinds of emulsions that if it is adjusted to operate on one variety of emulsion it will fail to function entirely on another. For example, using a potential of 16,000 volts on the electrode 21 it is often necessary to adjust this electrode so that it is within two inches of the turned up edges of the hole 20 before disruptive electrical discharges will take place through the emulsion, and it has been my experience that such disruptive discharges are necessary to successful dehydration. If a different emulsion is now run through the apparatus it will perhaps be found that with a twelve inch gap the current flow is very heavy and no disruptive discharges will occur. This I believe is due to the formation of a very large number of high resistance paths. Strange to say this formation of high resistance paths does not depend on the amount of water in the emulsion. I have found that some emulsion containing over sixty per cent water will permit heavy discharges to occur without using excessive current, while other emulsions having materially less water will draw heavy currents without disruptive discharges and practically without dehydration. I have found further that the most trouble is experienced with emulsions in which the water is present in the form of very minute drops and to such emulsions I have given the name of tight emulsions. I believe that the difficulty of handling such emulsions in an electric treater is due almost wholly to the fineness of the water particles. For example, I show in Fig. 2 a microscope field in which there are a series of small water particles 40. Under the influence of an electric field these particles line themselves up between the electrodes in conducting chains, the path of the current through the chains being shown by dotted lines, each of these chains being in effect a conductor.

If now these chains be considered as electric conductors it will be evident that their resistance will be directly proportional to their length and inversely proportional to their area of cross section. As the length of the chains in any treater depends on the separation of the electrodes it is evident that for a fixed separation of the electrodes the length will be constant, and the resistance will vary inversely as the cross section or inversely as the square of the diameter of the average water particle. I have found however that the resistance of such chains varies much faster than would be indicated by the above theory, that is, that the resistance is much greater for fine emulsions than would be expected if the cross section alone determined this resistance. This I believe is due to the fact that the resistance is in a measure determined not by the proportion of water present but by the number of gaps between the water particles and that these gaps are not only much more numerous where the water is in fine particles than where it is present in larger masses and that in fine emulsions the proportion of such gaps to the total length of path is very great. Whatever may be the theory, and I do not wish to be limited in any way by theory, it is true that where the water is present exclusively in the form of fine emulsified particles that the individual chains are of very high resistance so that the current density in any chain is small.

It is essential to the operation of any electrical dehydration process that chains be formed and it is further essential that once formed that they do not persist indefinitely as the current flow therethrough is very wasteful. In other words, the formation of the chain apparently agglomerates the water and there is nothing gained by a further conduction through such chains once they are formed. In some processes it is the practice to move the electrodes to prevent the chains from persisting and in others it is the practice to move the emulsion in such a manner as to sweep the chains away from between the electrodes as soon as formed. A much better way is to provide means for making the chains self rupturing. This will occur whenever the current density in the finer portions of any chain exceeds a certain critical value. In this case it is probable that the current acting on a certain proportion of the smaller globules of water will rupture the chain by causing the globules to form steam and thus break the continuity of the current path. Where all the water globules are small and the resistance is very high this cannot occur, and if no means are provided for breaking the chains mechanically, the chains form and persist indefinitely. While the current in any such chain may be very small, the number of chains may be very great so that the total current is considerable. It is found that in a treater such as that illustrated that when tight emulsions are run through the treater that no disruptive discharges occur and the dehydration practically stops.

I have found that the remedy for this condition is to introduce into the stream of emulsion flowing into the treater additional water in the form of much larger water particles or masses. This water may be described as partly emulsified and partly free. As the terms emulsified water and free water are really only relative it is perhaps better to describe this additional water as in the form of globules having several times the diameter of the average particle of the tight emulsion that it is desired to treat.

Such an emulsion I show very much magnified in Fig. 3. It will be seen that in addition to the small particles 41, which correspond in size to the particles 40 shown in Fig. 2 and which may be considered as forming the original tight emulsion, we have present larger particles 42 which have been willfully introduced for the purpose of expediting the dehydration. I have found that my invention works well where the difference in size between the average particle 41 of the original tight emulsion and the new water globules 42 is considerably greater than that shown in the drawing.

I have found that any method of producing a coarse emulsion or mixture of free water particles and oil is satisfactory in carrying on my invention and I illustrate one such method. For the purpose of producing such an emulsion I insert into the pipe 16, for example, at an elbow 50, an injection pipe 51. This pipe is fed with liquid by means of an injector 52, of the form used in feeding water into boilers, fed with steam through a pipe 53. The fluid is conveniently fed to the injector through a pipe 54 which may be connected into the settling tank 12 at or near its bottom. For the purpose of allowing the operator to regulate the proportion of water and oil fed through the pipe 54 I have shown a swing pipe 55 controlled through a cable 56 and a winch 57. By swinging the pipe 55 about 58 as a center the level of the open end 59 can be varied so that either water alone or water mixed with more or less oil can be delivered to the pipe 54. As the coarse emulsion settles rapidly it is thus possible to use it over and over for the purpose above set forth.

From the above, the method of operation of my invention will be more or less evident. The tight emulsion containing the small particles 41 is fed through the pipe 50 and the pump 13 into the pipe 16 in which it is mixed with coarse emulsion containing the particles 42. The mixture is delivered to the treater 11 and subjected to the action of the electric current. In the treater 11 the emulsion is broken, the smaller particles being agglomerated to form larger ones and the larger ones being further enlarged so that they can readily settle out from the oil. The treated liquid is run into the settling tank 12 in which it is stratified, the water dropping to the bottom and the oil rising to the top. The oil is drawn off through the pipe 25 and the water is continually bled off through the pipe 30 as it settles, so that a fairly constant water level is maintained in the tank 12. Between the water and the oil in the tank 12 is a layer of coarse emulsion containing considerable free water, the proportion of water increasing with the depth. The injector 52 draws this emulsion through the pipe 54 and feeds it into the pipe 16. In so doing the emulsion is somewhat broken up and the steam from the injector further breaks it up so that a very coarse emulsion may be fed through the pipe 54, or in some cases even free water.

In the case of some emulsions the introduction of steam alone will provide enough coarse emulsion to make my method a success.

It will be seen that my invention comprises the novel idea of introducing into a fine emulsion a coarse emulsion for the purpose and in the manner set forth.

In practice in operating on California emulsions I prefer to use a voltage of from 10,000 to 16,000 volts and to locate the electrode 21 about two inches above the edge of the hole 20. The operator starts the emulsion into the treater 11 through the pipe 16. If the emulsion is not too fine he will immediately observe the appearance of bubbles on the surface of the liquid in the treater 11 and will hear an intermittent rumbling and crackling in the body of the oil. The current will also violently vary as can be observed by suitable indicating electrical devices, not shown, and the voltage will rise and fall in some degree depending on the characteristics of the transformer 23. When these conditions occur it has been my experience that the emulsion is being broken and that as soon as the mixture is run into the settling tank 12 that there will be a separation of the oil and water, the oil rising and the water falling. It is, of course, understood that a greater or less distance between the electrode 21 and the edges of the hole 20 may be necessary and that the exact distance can be readily found by trial.

If, however, the emulsion is a very fine one, all disruptive discharges will cease quite regardless of the electrode spacing and no bubbles will appear and no noise be heard. This I believe is due to the fact that the fine emulsion forms paths of such high resistance that currents of sufficient magnitude to disrupt the chains cannot occur. When the operator notes the cessation of the noise he starts the coarse emulsion to flowing through the pipe 54 by starting the injector 52. This forces the coarse emulsion into the stream of oil entering the treater and supplies a mixture in which disruptive discharges immediately begin to take place. The operator can tell as soon as the treater starts to operate properly by the fact that he can see large bubbles and hear heavy discharges. He then regulates the rate of flow of the heavy emulsion so that enough is supplied to cause the disruptive discharges.

I have found that where large amounts of heavy emulsion are added to the emulsion being treated that the capacity of the apparatus to dehydrate light emulsion is greatly increased and I am not sure what the practical limit is to the economic addition of such heavy emulsion. It will probably have to be determined by trial in each case. This can be done by observing the degree of dehydration under certain conditions and then observing whether the increase of the rate of flow of heavy emulsion, other things being constant, results in a lowering or raising of the proportion of emulsion in the oil. It is a strange fact, but even with tight emulsions having a large proportion of water the addition of more water in the form of loose emulsion will often very greatly increase the capacity of the apparatus.

I claim as my invention:

1. A process of dehydrating fine emulsions of oil and water which comprises mixing coarse emulsion with the fine emulsion and subjecting the mixture to the action of an electric current.

2. A process of dehydrating fine emulsions of oil and water which comprises mixing a coarse emulsion with the fine emulsion and thereafter passing the mixture between electrodes having a sufficient potential difference to cause an electric current to flow through said mixture.

3. That step in the art of electrically dehydrating an emulsion, containing water particles of a certain average size, which comprises introducing into said emulsion water particles of a much greater size than said average particles, and thereafter subjecting the mixture to the action of an electric current.

4. An apparatus for dehydrating emulsions comprising a treater adapted to cause currents to flow through the emulsion; means for forcing an emulsion containing fine water particles through said treater; and means for introducing coarse water particles into said emulsion just before it enters said treater.

5. A process of dehydrating petroleum emulsions having a certain average size of particle which comprises adding to and mixing with said emulsion an emulsion made up of water particles of a radically different size and subjecting the mixture to an electric current.

6. That method of regulating the operation of a dehydrator which comprises artificially controlling the average size of the water particles which are carried in the emulsion at the point where an electric stress is set up.

7. An apparatus for dehydrating petroleum emulsions comprising a treater; means for causing an electric current to flow through the oil in said treater; mixture pipe arranged to discharge into said treater; a fine emulsion pipe delivering a fine emulsion to said mixture pipe; and a coarse emulsion pipe delivering a coarse emulsion to said mixture pipe.

In testimony whereof, I have hereunto set my hand at Los Angeles, California, this 29th day of June, 1921.

FORD W. HARRIS.